(12) United States Patent
Yasuda et al.

(10) Patent No.: US 9,502,176 B2
(45) Date of Patent: Nov. 22, 2016

(54) CONTACTLESS POWER SUPPLY TRANSFER TRANSFORMER

(71) Applicant: TECHNOVA INC., Tokyo (JP)

(72) Inventors: Tomio Yasuda, Saitama (JP); Hiroyuki Kishi, Tokyo (JP); Isami Norigoe, Tokyo (JP)

(73) Assignee: TECHNOVA INC., Tokyo (JP)

( * ) Notice: Subject to any disclaimer, the term of this patent is extended or adjusted under 35 U.S.C. 154(b) by 162 days.

(21) Appl. No.: 14/401,365

(22) PCT Filed: May 21, 2013

(86) PCT No.: PCT/JP2013/064132
§ 371 (c)(1),
(2) Date: Nov. 14, 2014

(87) PCT Pub. No.: WO2013/176151
PCT Pub. Date: Nov. 28, 2013

(65) Prior Publication Data
US 2015/0155094 A1 Jun. 4, 2015

(30) Foreign Application Priority Data
May 21, 2012 (JP) .................. 2012-116054

(51) Int. Cl.
*B60L 1/00* (2006.01)
*H01F 38/14* (2006.01)
(Continued)

(52) U.S. Cl.
CPC ............. *H01F 38/14* (2013.01); *B60L 11/182* (2013.01); *B60L 11/1833* (2013.01);
(Continued)

(58) Field of Classification Search
USPC .................................. 307/10.1, 104
See application file for complete search history.

(56) References Cited

U.S. PATENT DOCUMENTS 5,814,900 A * 9/1998 Esser ...................... H01F 38/18
307/104
8,646,585 B2 2/2014 Ichikawa et al.
(Continued)

FOREIGN PATENT DOCUMENTS

| CN | 102177042 A | 9/2011 |
|---|---|---|
| JP | 1-173968 U | 12/1989 |
| JP | 8-236356 A | 9/1996 |
| JP | 11-176672 A | 7/1999 |

(Continued)

OTHER PUBLICATIONS

Communication mailed Jan. 8, 2016 in corresponding Eurpoean Patent Application No. 13793641.5 (10 pages).
(Continued)

*Primary Examiner* — Danny Nguyen
(74) *Attorney, Agent, or Firm* — Rothwell, Figg, Ernst & Manbeck, P.C.

(57) ABSTRACT

A contactless power transfer transformer includes main body. The main body includes magnetic pole core members, winding wire core member, and wire. The winding wire core member is orthogonal to the magnetic pole core members and connects one portion of each of the pair of parallel magnetic pole core members with each other. The main body is fixed to fixing plate having a magnetic shield function and heat dissipation function. The connecting position of the winding wire core member with respect to the magnetic pole core members is located toward one side from a center in the longitudinal direction of the magnetic pole core members. At least a space between the pair of the magnetic coil core members each containing an end portion longer in distance to the connecting position is used as an arrangement space of component electrically connected to the electric wire.

6 Claims, 11 Drawing Sheets

(51) Int. Cl.
  *B60L 11/18* (2006.01)
  *H01F 27/24* (2006.01)
  *H01F 27/29* (2006.01)
  *H01F 27/36* (2006.01)
  *H02J 17/00* (2006.01)
  *H01F 27/26* (2006.01)
  *H01F 27/28* (2006.01)
  *H01F 27/30* (2006.01)
  *B60M 7/00* (2006.01)

(52) U.S. Cl.
  CPC ........... *H01F 27/24* (2013.01); *H01F 27/263* (2013.01); *H01F 27/2823* (2013.01); *H01F 27/2876* (2013.01); *H01F 27/2885* (2013.01); *H01F 27/29* (2013.01); *H01F 27/306* (2013.01); *H01F 27/365* (2013.01); *H02J 17/00* (2013.01); *B60L 2210/10* (2013.01); *B60L 2210/30* (2013.01); *B60L 2210/40* (2013.01); *B60M 7/003* (2013.01); *Y02T 10/7005* (2013.01); *Y02T 10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

2011/0193503 A1*  8/2011  Miles .................. H02K 7/075
                                                        318/129
2014/0015338 A1  1/2014  Yoshino et al.

FOREIGN PATENT DOCUMENTS

| | | |
|---|---|---|
| JP | 11-297520 A | 10/1999 |
| JP | 2004-152947 A | 5/2004 |
| JP | 2010-268660 A | 11/2010 |
| JP | 2011-50127 A | 3/2011 |
| JP | 2011-167020 A | 8/2011 |
| JP | 2011-176914 A | 9/2011 |
| WO | 2012/132535 A1 | 10/2012 |

OTHER PUBLICATIONS

Shigeru Abe et al. "Denki Jidosha-yo Hi Sesshoku Kyuden no Gijutsu Doko = Technology Trends of Contactless Power Transfer Systems for Electric Vehicle", National Convention Record, I.E.E., Japan, Industry Applications Society, vol. 2011, Sep. 6, 2011, pp. II-205, XP008174374 (6 pages).

International Search Report mailed Aug. 27, 2013 in PCT/JP2013/064132.

Office Action mailed Sep. 27, 2016 in corresponding Japanese Patent Application No. 2014-516818 (with an English translation) (5 pages).

* cited by examiner

|  | Set of the PCB* without parts | Set of the PCB with parts |
|---|---|---|
| Primary resistance $r_1$ [m$\Omega$] | 1.00 | 0.97 |
| Secondary resistance $r_2$ [m$\Omega$] | 1.01 | 1.09 |
| Primary inductance $L_1$ [$\mu$H] | 1.00 | 0.99 |
| Secondary inductance $L_2$ [$\mu$H] | 1.00 | 1.02 |
| Coupling factor $\kappa$ | 1.00 | 1.01 |
| Resistance at $\eta_{max} R_{Lmax}$ [$\Omega$] | 1.00 | 0.96 |
| Maximum efficiency $\eta_{max}$ [%] | 1.00 | 0.997 | ately
CONTACTLESS POWER SUPPLY TRANSFER TRANSFORMER

CROSS REFERENCE TO RELATED APPLICATION

This application is a 35 U.S.C. 371 National Phase Entry Application from PCT/JP2013/064132, filed May 21, 2013, which claims priority to Japanese Patent Application No. 2012-116054, filed May 21, 2012, the disclosures of which are incorporated herein in their entirety by reference.

TECHNICAL FIELD

The present invention relates to a power transfer transformer of a contactless power transfer system that transfers power to an electric vehicle or the like in contactless manner and to an electric component connected to the power transfer transformer, by which it becomes easy to install the transformer in a vehicle and the like.

BACKGROUND ART

Conventionally, as one example of a system for charging a battery of an electric vehicle or a plug-in hybrid car, there has been developing a method that transfers power to the vehicle in contactless manner by using electromagnetic induction, as illustrated in FIG. 8. In particular, the method transfers power from a primary transformer (power transmitting transformer) 31 provided on the ground to a secondary transformer (power receiving transformer) 33 of a power transfer transformer 30 of a contactless power transfer system installed on a floor of the vehicle.

The plug-in hybrid car to be charged includes: an engine 54 and a motor 53 as a driving source; a secondary battery 51 that is a power source for the motor; and an inverter 52 that converts a direct current of the secondary battery 51 to an alternative current, and supplies the alternative current to the motor.

The contactless power transfer system includes, on the ground side: a variable voltage rectifier 10 that converts an alternative current of the commercial power source to a direct current, and changes the voltage thereof; an inverter 20 that generates a high-frequency alternative current from the direct current; a power transmitting transformer 31 that is one of the contactless power transfer transformer 30; and a primary series capacitor 32 that is connected to the power transmission transformer 31 in series.

On the other hand, the contactless power transfer transformer 30 includes, on the vehicle side: a power receiving transformer 33 that is other one of the contactless power transfer transformer 30; a rectifier 35 that converts the alternative current to the direct current for the secondary battery; and a secondary parallel resonance capacitor 34 that is connected between the power receiving transformer 33 and the rectifier 35 in parallel.

FIG. 9 illustrates one example of a circuit diagram of the contactless power transfer system.

For such a system, the power transfer efficiency is desired not to be largely decreased even in the case when a stop position of the vehicle is misaligned and thereby the power transmitting transformer 31 and the power receiving transformer 33 do not oppose each other or in the case when a gap (spacing) between the power transmitting transformer 31 and the power receiving transformer 33 is changed.

Patent Literature 1 described below discloses a contactless power transfer transformer that allows large position deviation or large change in the gap and that can be configured in a small size. As illustrated in FIG. 10A to 10F, the contactless power transfer transformer is configured by an H-shaped ferrite core 40. Portions of the ferrite core 40 parallel to each other at the both sides of the H-shape is provided as magnetic pole portions 41, 42. A portion corresponding to the horizontal pole of the H-shape, i.e., a winding wire core member 43 (a portion connecting between the magnetic pole portions) is wound around by an electric wire 50. FIG. 10A is a state in which the electric wire 50 is wound around the ferrite core 40, and FIG. 10D is a state in which the electric wire 50 is not wound around the ferrite core 40. Further, FIG. 10B is a cross-sectional view taken along a line A-A of FIG. 10A, and FIG. 10C is a cross-sectional diagram taken along line B-B of FIG. 10A. Similarly, FIG. 10E is a cross-sectional view taken along a line A-A of FIG. 10D, and FIG. 10F is a cross-sectional view taken along line B-B of FIG. 10D.

According to the contactless power transfer transformer that uses the H-shape core, the following properties which satisfies utility can be obtained when the power transfer of 3 kW is performed by the power transmitting transformer and the power receiving transformer opposing each other with a standard gap length of 70 mm. That is, the efficiency of the transformer is 95%, the allowable position deviation in the left and right direction (y direction in FIG. 10A) is ±150 mm, the allowable position deviation in the front and back direction is ±60 mm, and the efficiency at which the standard gap length is increased to 100 mm is 92%.

Furthermore, as the contactless power transfer transformer that uses the H-shape core, there exists a prototype that can perform fast charging at large capacity of greater than or equal to 10 kW.

CITATION LIST

Patent Literature

Patent Literature 1: Japanese Patent Application Laid-open No. 2011-50127

SUMMARY OF INVENTION

Problem to be Solved by the Invention

FIG. 11 illustrates one example of a contactless power transfer transformer having the H-shape core, which is produced as a prototype product to be installed in a vehicle or on the ground.

According to the product, a coil main body is formed by winding the electric wire 50 around a wound portion (in this figure, it cannot be seen since the electric wire 50 are wound therearound) connecting the magnetic pole portions 41, 42. Then, the coil main body is fixed to a fixing plate 60, which is a base plate of a housing. The fixing plate 60 is attached to the floor of the vehicle on its exterior side, in case when the product is installed in the vehicle. As for the actual product, the front face of the fixing plate 60 at which the coil main body is fixed (a face opposing other transformer) is to be covered by a resin cover. However, in FIG. 11, the resin cover is omitted.

The fixing plate 60 is made of an aluminum plate. The fixing plate 60 has: a function of magnetically shielding leakage magnetic flux of the coil main body; and a function of dissipating heat generated by the coil main body at the time when the current goes therethrough. To the fixing plate 60 and at a middle position between the magnetic pole portions 41 and 42, an inlet and outlet 61 that guides in and out an end portion of the electric wire 50 is formed. The reasons for providing the inlet and outlet 61 at this position are provided below.

FIG. 12 illustrates a distribution of the leakage magnetic flux generated by the coil main body having the H-shape core. The leakage magnetic flux is represented by the hatching around the ferrite core 40. At the middle position between the magnetic pole portion 41 and the magnetic pole portion 42, the distribution density of the leakage magnetic flux decreases as moving away from the electric wire 50, and is the lowest at the middle position 100 (at the position of the line segment 100-100) between the magnetic pole portion 41 and the magnetic pole portion 42. Therefore, even if the inlet and outlet 61 is provided to the fixing plate 60 at such a position and guides out the electric wire, the magnetic shielding function of the fixing plate 60 can be maintained.

However, if the contactless power transfer transformer is applied to a product to be installed in the vehicle, it is required to electrically connect the electric wire 50 taken out from the inlet and outlet 61 of the fixing plate 60 to the secondary parallel resonance capacitor 34 and the rectifier 35, as illustrated in FIG. 8. Further, if the contactless power transfer transformer is applied to a product that is to be installed on the ground, it is required to electrically connect the electric wire 50 to the primary series capacitor 32. Therefore, the operation load at the time of installing the transformer is increased, and also, it is required to secure a wiring space.

The present invention is provided in view of the foregoing, it is an object to provide a contactless power transfer transformer that does not require to secure the wiring space upon installation and that is capable of easy installation.

Means for Solving Problem

According to one aspect of the present invention, a contactless power transfer transformer includes a coil main body. The coil main body includes: magnetic pole core members that constitute a pair of parallel magnetic pole portions; a winding wire core member that is orthogonal to the magnetic pole core members and connects one portion of each of the pair of parallel magnetic pole core members with each other; and an electric wire that is wound around the winding wire core member. The coil main body is fixed to a fixing plate having a magnetic shield function and a heat dissipation function. A connecting position of the winding wire core member with respect to the magnetic pole core members is located toward one side from a center in the longitudinal direction of the magnetic pole core members. At least a space between the pair of the magnetic coil core members each containing an end portion longer in a distance to the connecting position is used as an arrangement space of a component electrically connected to the electric wire.

According to the contactless power transfer transformer, a position of a winding wire portion of the H-shape core is off-centered toward one side, and the resulting space is used as an arrangement space of a component that is to be electrically connected to the electric wire.

Further, in the contactless power transfer transformer according to another aspect of the present invention, the arrangement space may be set to an area separated from the electric wire wound around the winding wire core member and the magnetic pole core members.

That is to say, in order to prevent the component from gaining the loss due to the leakage magnetic flux, the arrangement space is set to an area where the leakage magnetic flux from the coil main body is less.

Further, in the contactless power transfer transformer according to still another aspect of the present invention, the electric wire wound around the winding wire core member may constitutes a primary coil, and the component may be a capacitor connected to the primary coil in series.

In this case, a capacitor that is directly connected to a primary coil may be installed to a power transmitting transformer having the primary coil.

Further, in the contactless power transfer transformer according to still another aspect of the present invention, the electric wire wound around the winding wire core member may constitutes a secondary coil, and the component may be a capacitor connected to the secondary coil in parallel.

In this case, a capacitor that is directly connected to a secondary coil may be installed to a power receiving transformer having the secondary coil.

Further, in the contactless power transfer transformer according to still another aspect of the present invention, the electric wire wound around the winding wire core member may constitutes a secondary coil, and the component may be a capacitor connected to the secondary coil in parallel and a rectifier connected to the capacitor in parallel.

In this case, a capacitor that is directly connected to a secondary coil and a rectifier may be installed to a power receiving transformer having the secondary coil.

Further, in the contactless power transfer transformer according to still another aspect of the present invention, the rectifier may be attached directly to the fixing plate.

In this case, a fixing plate that is a base plate of a housing can be used as a cold plate of a rectifier.

EFFECT OF THE INVENTION

According to a contactless power transfer transformer of the present invention, a coil main body and a component electrically connected to the coil main body are housed by using an arrangement space between the magnetic pole core members. Therefore, it becomes unnecessary to secure the wiring space for the component, and load on the wiring operation at the time of installing the transformer is reduced. Further, the primary series capacitor Cs and the secondary parallel capacitor Cp are determined by the transformer constant illustrated in (Expression 1) and (Expression 2). Therefore, it is preferred that primary series capacitor Cs and the secondary parallel capacitor Cp are provided near the transformer. In FIG. 1, $\omega_0 = 2\pi f$, where f is a power source frequency applied to the contactless transfer transformer. Further, $X_p$ is an impedance, $X_0'$ is a secondary conversion excitation reactance of the contactless power transfer transformer, $X_2$ is a secondary leakage reactance of the contactless power transfer transformer. Further, in Expression 2, $C_s'$ is a secondary conversion primary series capacitor, $X_s'$ is an impedance, and $X_1'$ is a secondary conversion primary leakage reactance of the contactless power transfer transformer. Still further, by providing a parallel capacitor and a rectifier in the secondary power transfer transformer, an influence of the electric noises on many of the electronic component installed in the vehicle can be reduced.

[Number 1]

$$\frac{1}{\omega_0 C_P} = X_P = X_0' + X_2 \qquad \text{(Expression 1)}$$

-continued

[Number 2]

$$\frac{1}{\omega_0 C_S'} = X_S' = \frac{X_0' X_2}{X_0' + X_2} + X_1' \quad \text{(Expression 2)}$$

MODE(S) FOR CARRYING OUT THE INVENTION

In the following, an embodiment of a contactless power transfer transformer according to the present invention is described in details with reference to the drawings. The present invention is not limited to by the embodiment.

Figure 1:
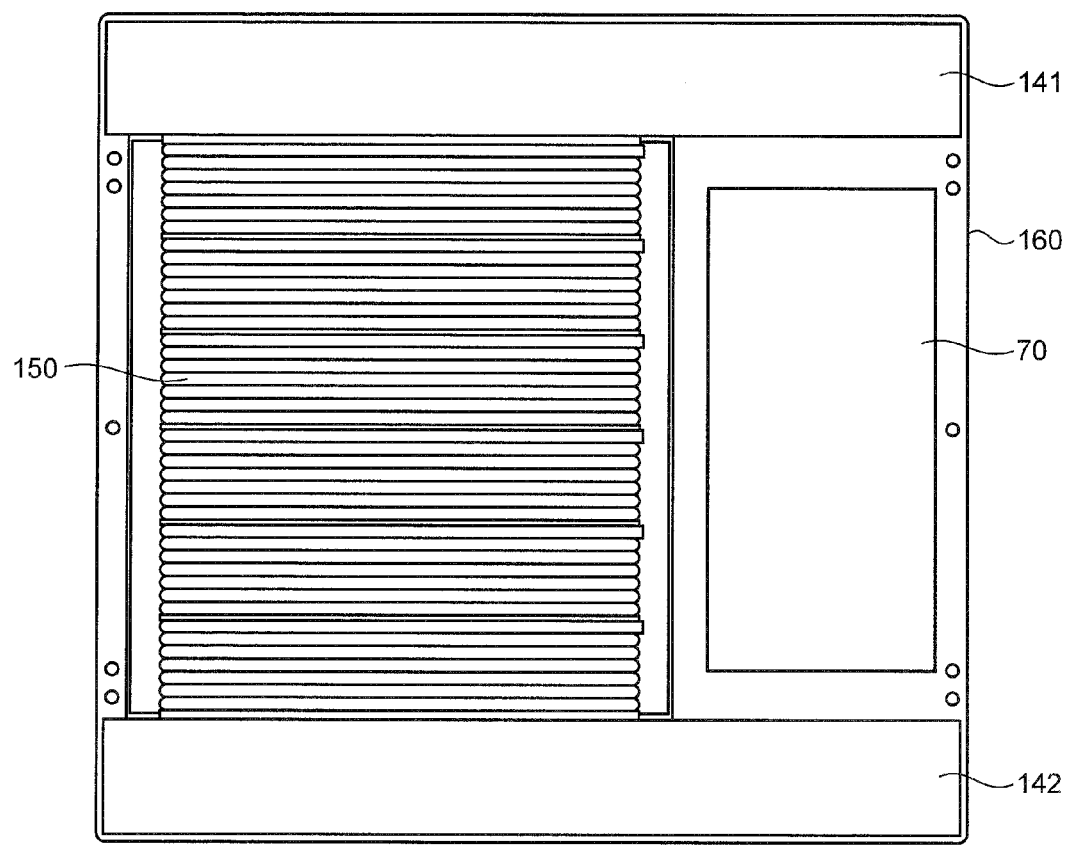
FIG. 1 is a diagram illustrating a contactless power transfer transformer according to an Embodiment.

FIG. 1 illustrates a contactless power transfer transformer according to an embodiment of the present invention.

Figure 11:
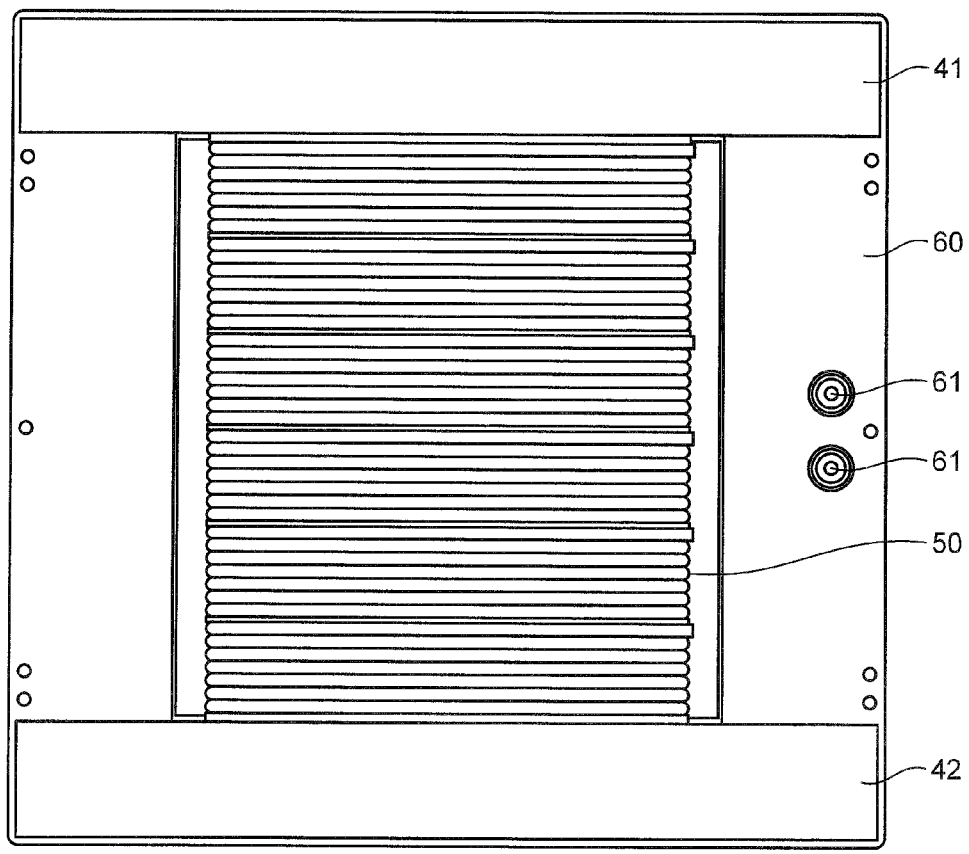
FIG. 11 is a diagram illustrating one example of the contactless power transfer transformer having the H-shape core.

The coil main body is configured by: magnetic pole core members 141, 142 constituting a pair of parallel magnetic pole portions; and a winding wire core member (in this figure, it cannot be seen because the electric wire 150 is wound therearound) that is orthogonal to the magnetic pole core members 141, 142. In this regard, the coil main body is similar to the coil main body having the H-shape core of FIG. 11. However, the contactless power transfer transformer of the present embodiment differs from the coil main body of FIG. 11 in that the connecting position of the winding wire core member with respect to the magnetic pole core members 141, 142 is located toward one side from the middle in the longitudinal direction of the magnetic pole core members 141, 142, so that the core has "C-shape".

The coil main body is fixed to a fixing plate 160 formed of an aluminum plate, which is a base plate of the housing.

The contactless power transfer transformer uses a space created by positioning the electric wire 150 and the winding wire core member toward one side in the longitudinal direction of the magnetic pole core members 141, 142. The contactless power transfer transformer uses an area separated from the electric wire 150 and the magnetic pole core members 141, 142 as an arrangement space 70 of a component that is electrically connected to the electrical wire 150.

Figure 8:
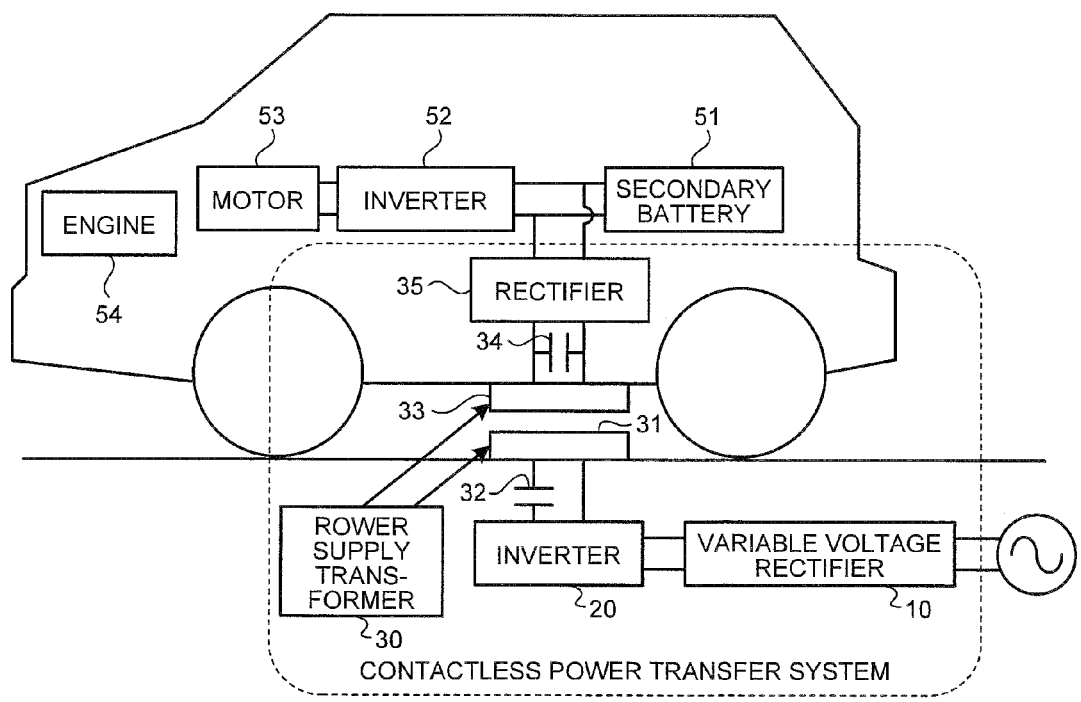
FIG. 8 is a diagram illustrating one example of a contactless power transfer system for a vehicle.

In the power transmitting transformer, a primary series capacitor 32 (see FIG. 8) that is connected to a primary coil in series is arranged in the arrangement space 70.

Further, in a power receiving transformer, a secondary parallel resonance capacitor 34 (see FIG. 8) that is connected to a secondary coil in parallel is arranged in the arrangement space 70. Further, in the power receiving transformer, a rectifier 35 (see FIG. 8) that is connected to the secondary parallel resonance capacitor 34 can be arranged in the arrangement space 70.

Figure 2:
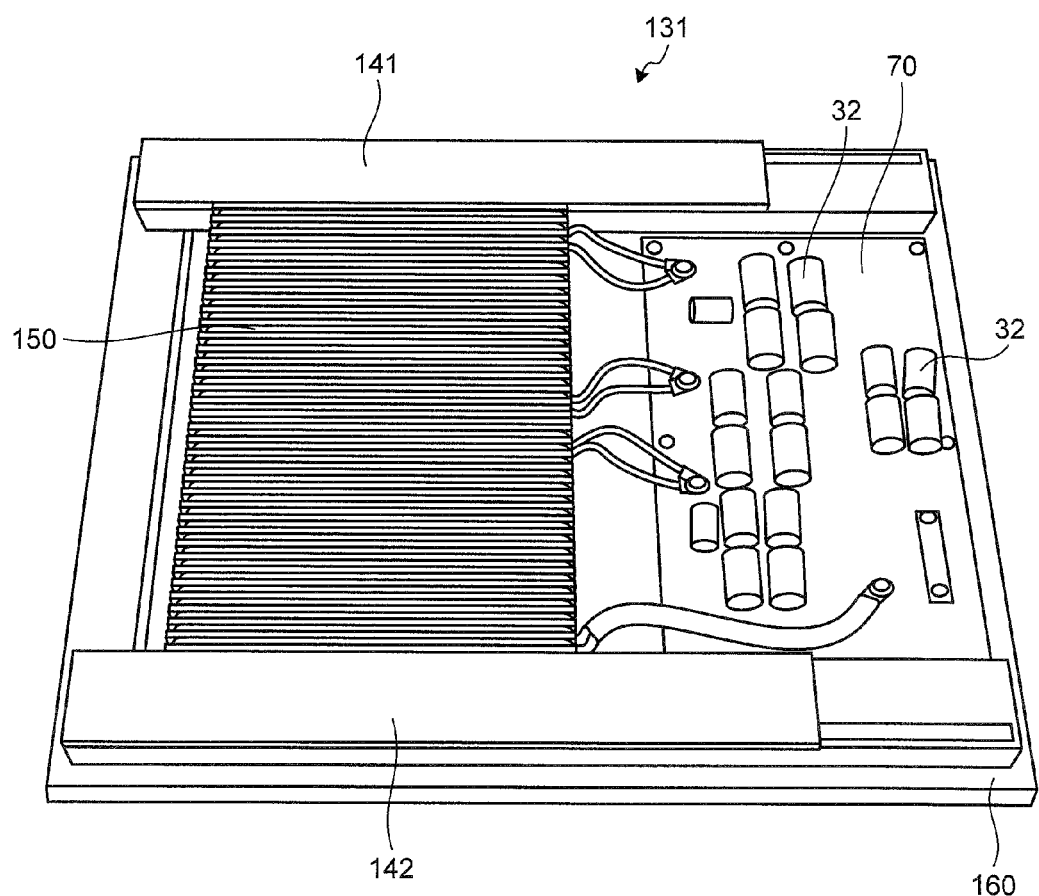
FIG. 2 is a diagram illustrating an inside of a power transmitting transformer according to the embodiment.

FIG. 2 illustrates a power transmitting transformer 131 in which a mount printed circuit board is attached to the arrangement space 70 and the primary series capacitor 32 is arranged thereon.

Figure 3:
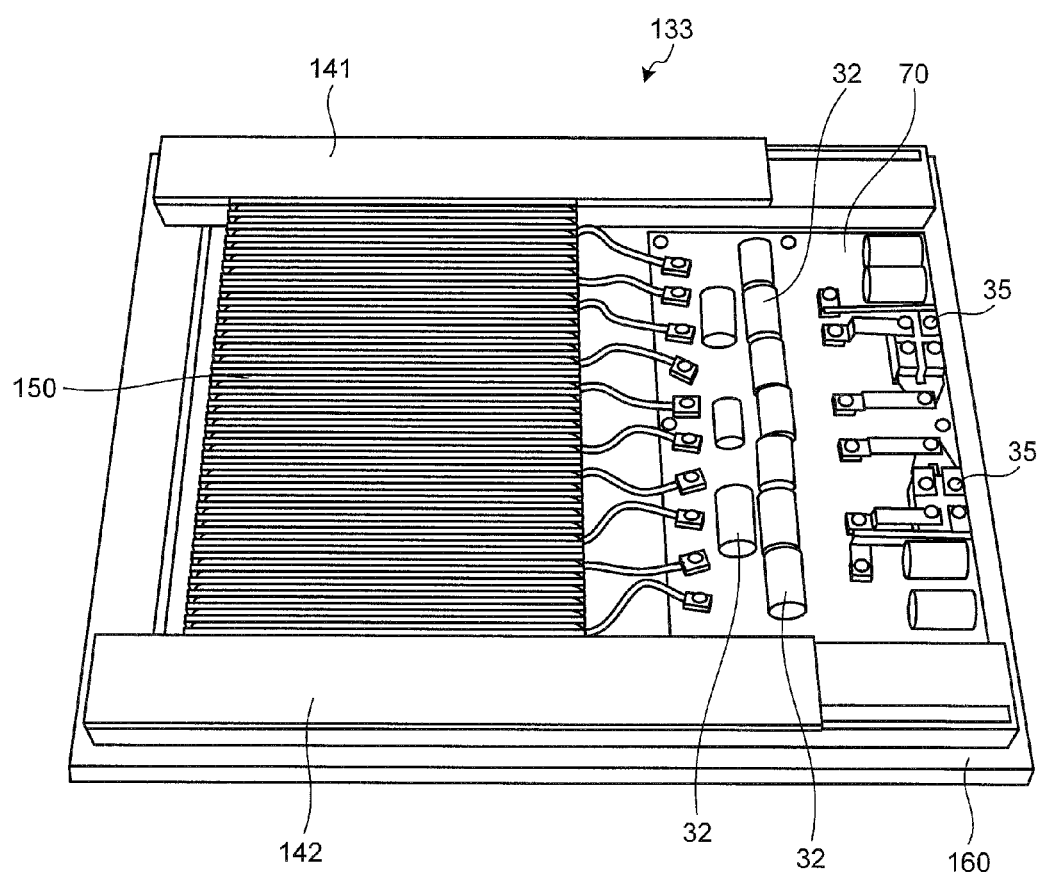
FIG. 3 is a diagram illustrating an inside of a power receiving transformer according to the embodiment.

Further, FIG. 3 illustrates a power receiving transformer 133 in which a mount printed circuit board attached to the arrangement space 70 and the primary series capacitor 32 and the rectifier 35 are arranged.

Figure 4:
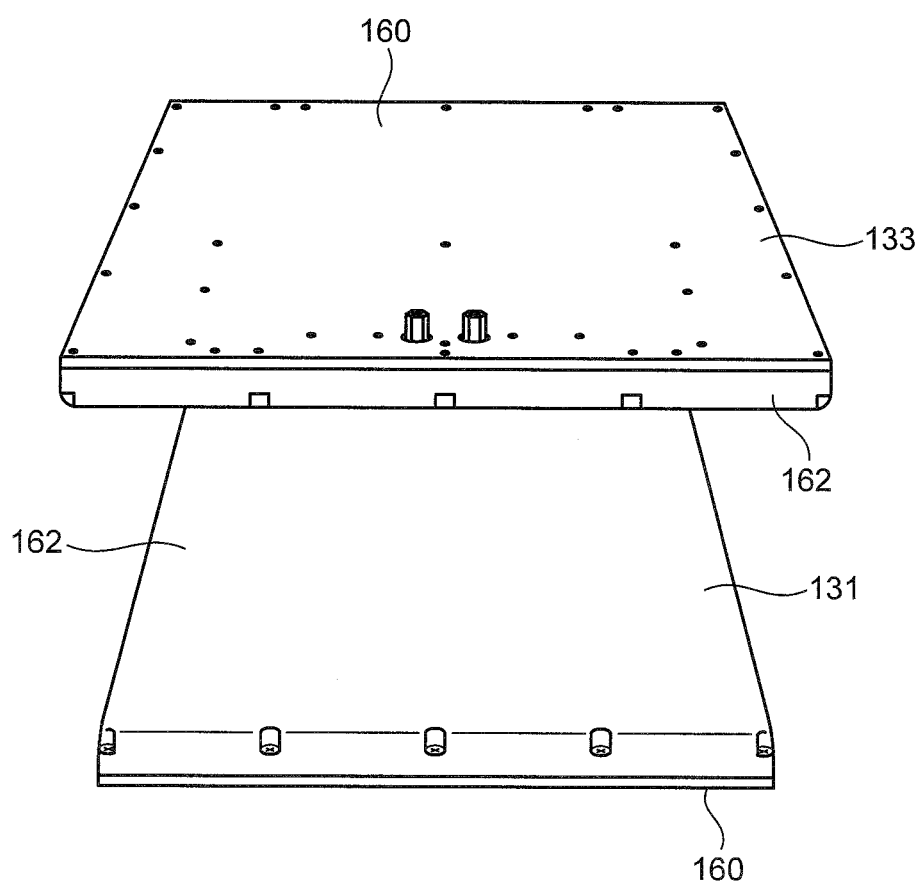
FIG. 4 is a diagram illustrating an outer shape of the power transmitting transformer and the power receiving transformer according to the embodiment.

Further, FIG. 4 illustrates an exterior appearance of the power transmitting transformer 131 and the power receiving transformer 133 in which the resin cover 162 of the housing is fixed to the fixing plate 160.

As illustrated in FIGS. 2 and 3, the arrangement space 70 of the component may be expanded beyond the space between the pair of magnetic pole core members 141 and 142.

Figure 12:
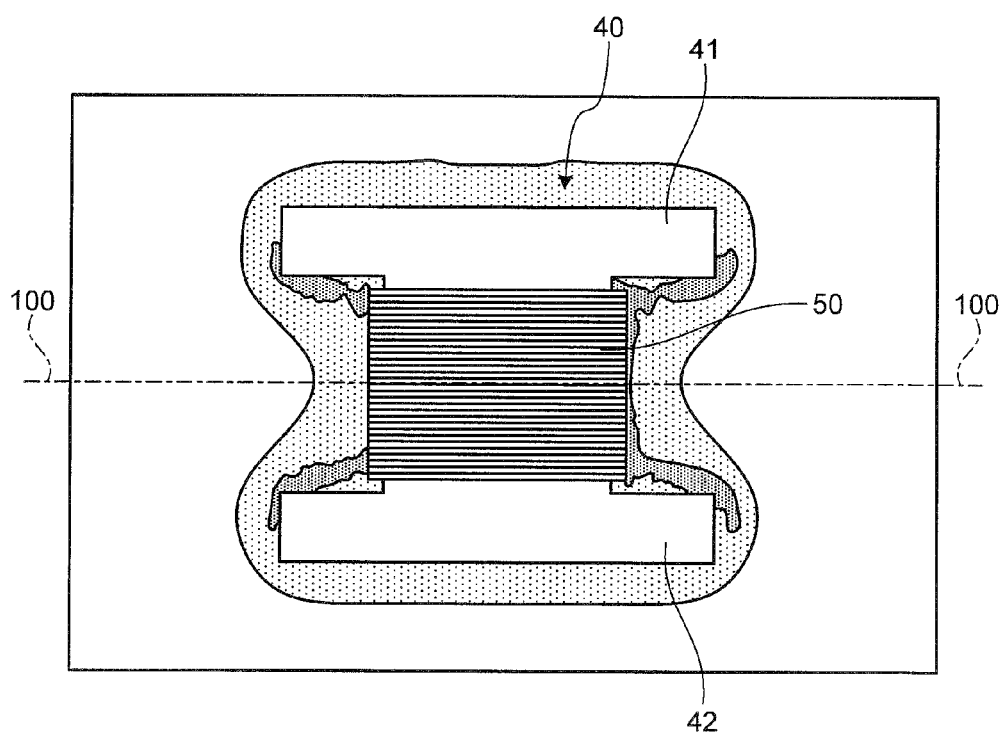
FIG. 12 is a diagram illustrating one example of a leakage magnetic flux distribution of the coil main body having the H-shape core.

As is apparent from FIG. 12, in the space between the pair of magnetic pole core members 141, 142, the distribution of the leakage magnetic flux generated by the coil main body decreases as the distance from the electric wire 150 and the magnetic pole core members 141, 142 increase. The influence of the leakage magnetic flux on these components can be removed by arranging the primary series capacitor 32, the rectifier 35, and/or the like, in the area with less leakage magnetic flux.

Figures 5, 6:
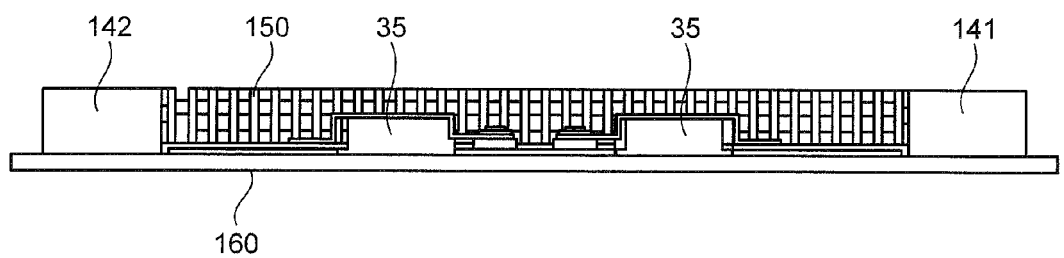
FIG. 5 is a diagram illustrating a mode in which the rectifier is directly attached to a fixing plate.
FIG. 6 is a diagram for explaining a measured value of a transformer constant of the contactless power transfer transformer according to the embodiment.

Here, as illustrated in FIG. 5, the rectifier 35 may be directly attached to the fixing plate 160 so as to use the fixing plate 160 as a cold plate for the rectifier 35.

As described above, even if the primary series capacitor 32 and the rectifier 35 are installed in the contactless power transfer transformer, the transformer constant and the power transfer efficiency do not change largely.

In order to confirm that the transformer constant and the power transfer efficiency do not change largely, the contactless power transfer transformer is set to have three states, namely, a "state in which no built-in components are installed", a "state in which a printed circuit board (PCB) with no components mounted thereon is installed", and a "state in which a printed circuit board with components mounted thereon is installed". Then, a transformer property is measured for each of the states, and the measured transformer properties are compared with each other.

FIG. 6 illustrates measured values of the transformer constants of the "state in which a printed circuit board (PCB) with no components mounted thereon is installed" and the "state in which a printed circuit board with components mounted thereon is installed" are normalized by the transformer constant of the "state in which no built-in components are installed". In all of the cases, the change in the transformer constant and the theoretical maximum efficiency is small. Therefore, it can be understood that the installation of the components does not have influence thereon.

Further, according to the contactless power transfer transformer, the electric wire 150 and the winding wire core member are located toward one side in the longitudinal direction (y direction in FIG. 1) of the magnetic pole core members 141, 142. Therefore, there is a concern that, for the case when the power transmitting transformer 131 and the power receiving transformer 133 are misaligned in the y direction, the position deviation property becomes asymmetric. However, from the measurement result, it is clear that the position deviation property in the y direction is symmetric.

Figure 7:
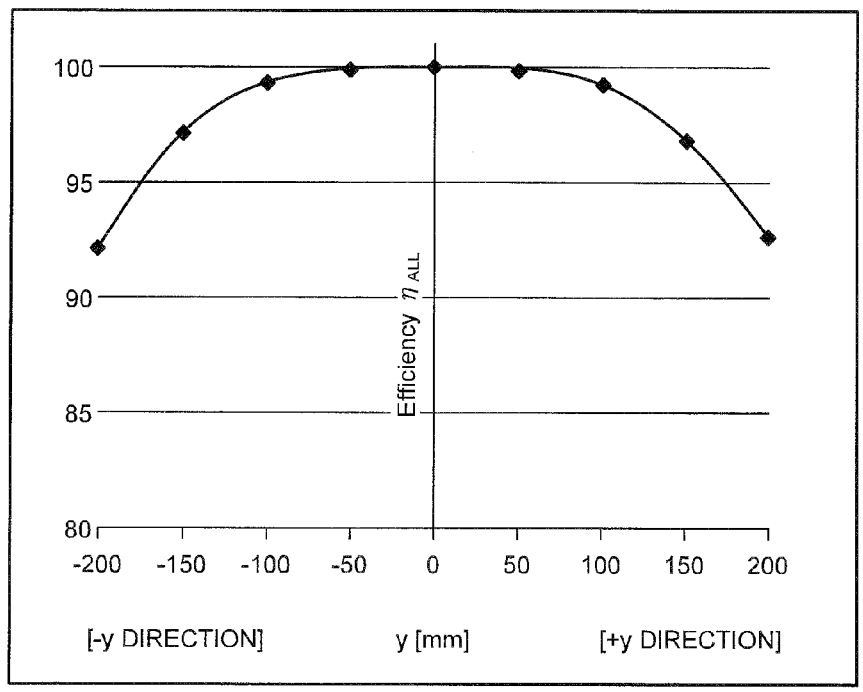
FIG. 7 is a diagram illustrating a graph representing a position deviating property of the contactless power transfer transformer according to the embodiment.
Figure 9:
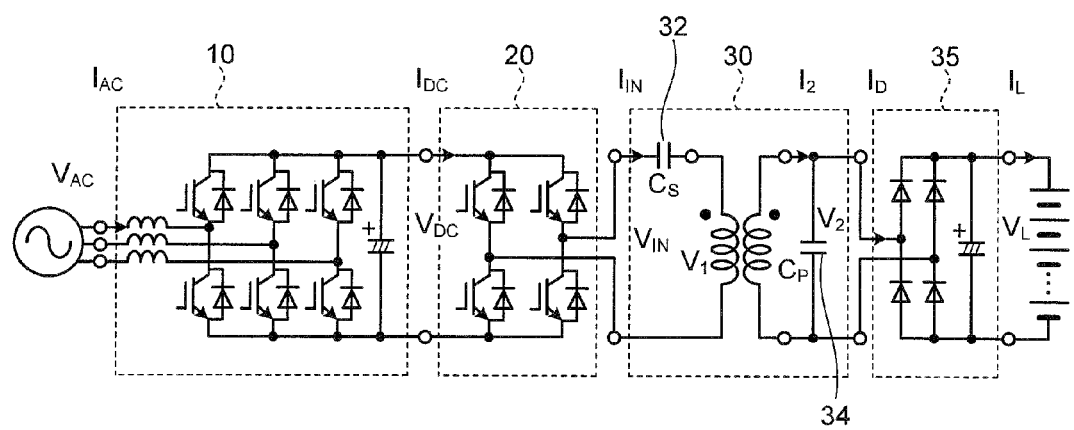
FIG. 9 is a diagram illustrating one example of a circuit diagram of the contactless power transfer system of FIG. 8.
Figure 10A:
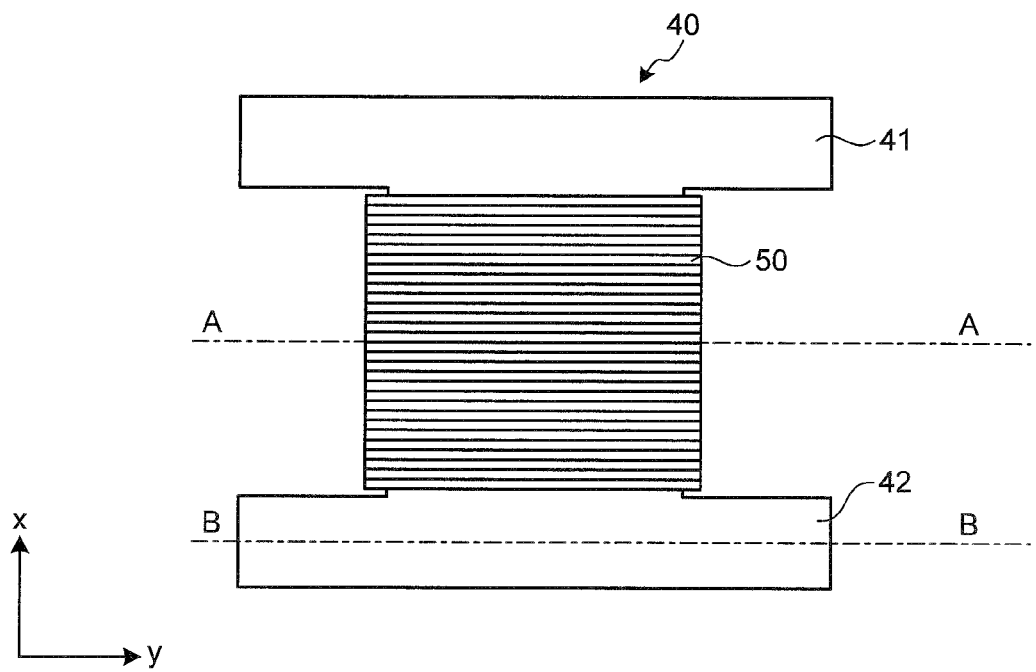
FIG. 10A is an explanatory diagram of a coil main body having an H-shape core, and illustrating a state in which a coil is wound therearound.
Figure 10B:
FIG. 10B is a cross-sectional diagram taken along a line A-A of FIG. 10A.
Figure 10C:
FIG. 10C is a cross-sectional diagram taken along a line B-B of FIG. 10A.
Figure 10D:
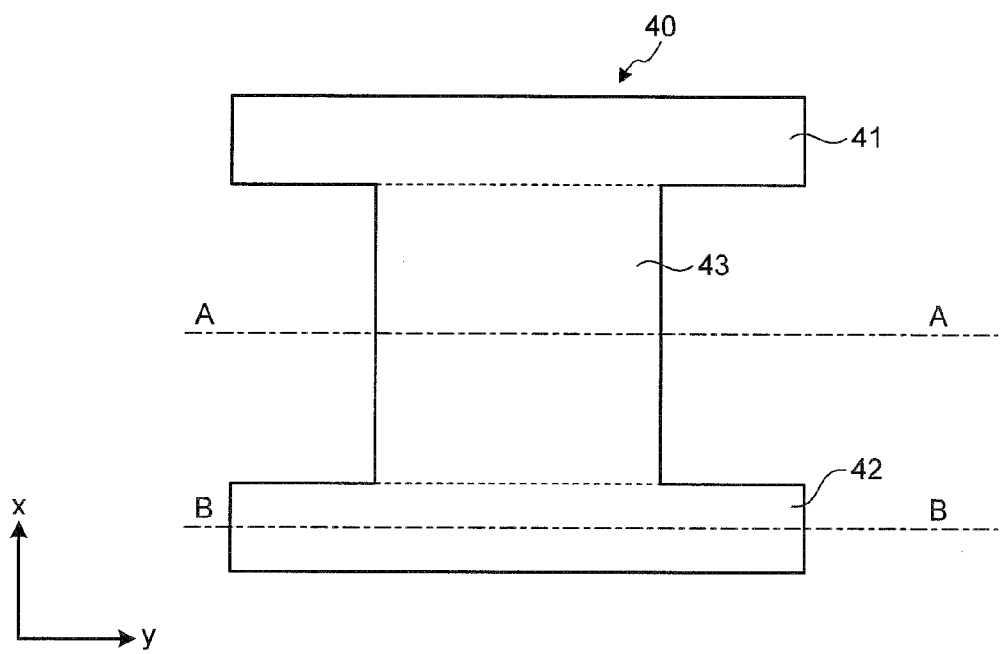
FIG. 10D is an explanatory diagram of the coil main body having the H-shape core, and illustrating a state in which the coil is not wound therearound.
Figure 10E:
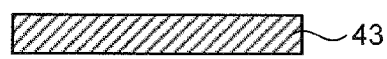
FIG. 10E is a cross-sectional diagram taken along a line A-A of FIG. 10D.
Figure 10F:
FIG. 10F is a cross-sectional diagram taken along a line B-B of FIG. 10D.

FIG. 7 illustrates a change in efficiency of when the power transmitting transformer and the power receiving transformer is misaligned in the y direction. Here, the efficiency is calculated by measuring the input terminal electrical power of the inverter 20 and the output terminal electrical power of the rectifier 35 in the circuit of FIG. 9. Then, the efficiency of the state in which there is no misalignment in the y direction is taken as a reference value, and normalizes the calculated efficiency.

From FIG. 7, it is clear that the symmetry of the position deviation in the y direction is maintained.

A contactless power transfer transformer according to the present invention can be easily installed, and can be widely used for contactless power transferring of various moving bodies such as an electric vehicle, a plug-in hybrid car, and/or the like.

REFERENCE SIGNS LIST

10 ADJUSTABLE VOLTAGE RECTIFIER
20 INVERTER
30 CONTACTLESS POWER TRANSFER TRANSFORMER
31 POWER TRANSMITTING TRANSFORMER
32 PRIMARY SERIES CAPACITOR
33 POWER RECEIVING TRANSFORMER
34 SECONDARY PARALLEL RESONANCE CAPACITOR
35 RECTIFER
40 FERRITE CORE
41 MAGNETIC POLE PORTION
42 MAGNETIC POLE PORTION
43 WINDING WIRE CORE MEMBER
50 ELECTRIC WIRE
51 SECONDARY BATTERY
52 INVERTER
53 MOTOR
54 ENGINE
60 FIXING PLATE
61 INLET AND OUTLET
70 ARRANGEMENT SPACE
131 POWER TRANSMITTING TRANSFORMER
133 POWER RECEIVING TRANSFORMER
141 MAGNETIC POLE CORE MEMBER
142 MAGNETIC POLE CORE MEMBER
150 ELECTRIC WIRE
160 FIXING PLATE
162 RESIN COVER

The invention claimed is:

1. A contactless power transfer transformer comprising:
a coil main body including:
   magnetic pole core members that constitutes a pair of parallel magnetic pole portions;
   a winding wire core member that is orthogonal to the magnetic pole core members and connects one portion of each of the pair of parallel magnetic pole core members with each other; and
   an electric wire that is wound around the winding wire core member, wherein
the coil main body is fixed to a fixing plate having a magnetic shield function and a heat dissipation function,
a connecting position of the winding wire core member with respect to the magnetic pole core members is located toward one side from a center in the longitudinal direction of the magnetic pole core members, and
at least a space between the pair of the magnetic coil core members each containing an end portion longer in a distance to the connecting position is used as an arrangement space of a component electrically connected to the electric wire.

2. The contactless power transfer transformer of claim 1, wherein the arrangement space is set to an area separated from the electric wire wound around the winding wire core member and the magnetic pole core members.

3. The contactless power transfer transformer of claim 2, wherein
the electric wire wound around the winding wire core member constitutes a primary coil, and
the component is a capacitor connected to the primary coil in series.

4. The contactless power transfer transformer of claim 2, wherein
the electric wire wound around the winding wire core member constitutes a secondary coil, and
the component is a capacitor connected to the secondary coil in parallel.

5. The contactless power transfer transformer of claim 2, wherein
the electric wire wound around the winding wire core member constitutes a secondary coil, and
the component is a capacitor connected to the secondary coil in parallel and a rectifier connected to the capacitor in parallel.

6. The contactless power transfer transformer of claim 5, wherein the rectifier is attached directly to the fixing plate.

* * * * *